March 11, 1969 — D. D. DRUM — 3,432,153
APPARATUS FOR COLLECTING CONTAMINANTS FROM GASES
Filed Sept. 25, 1967
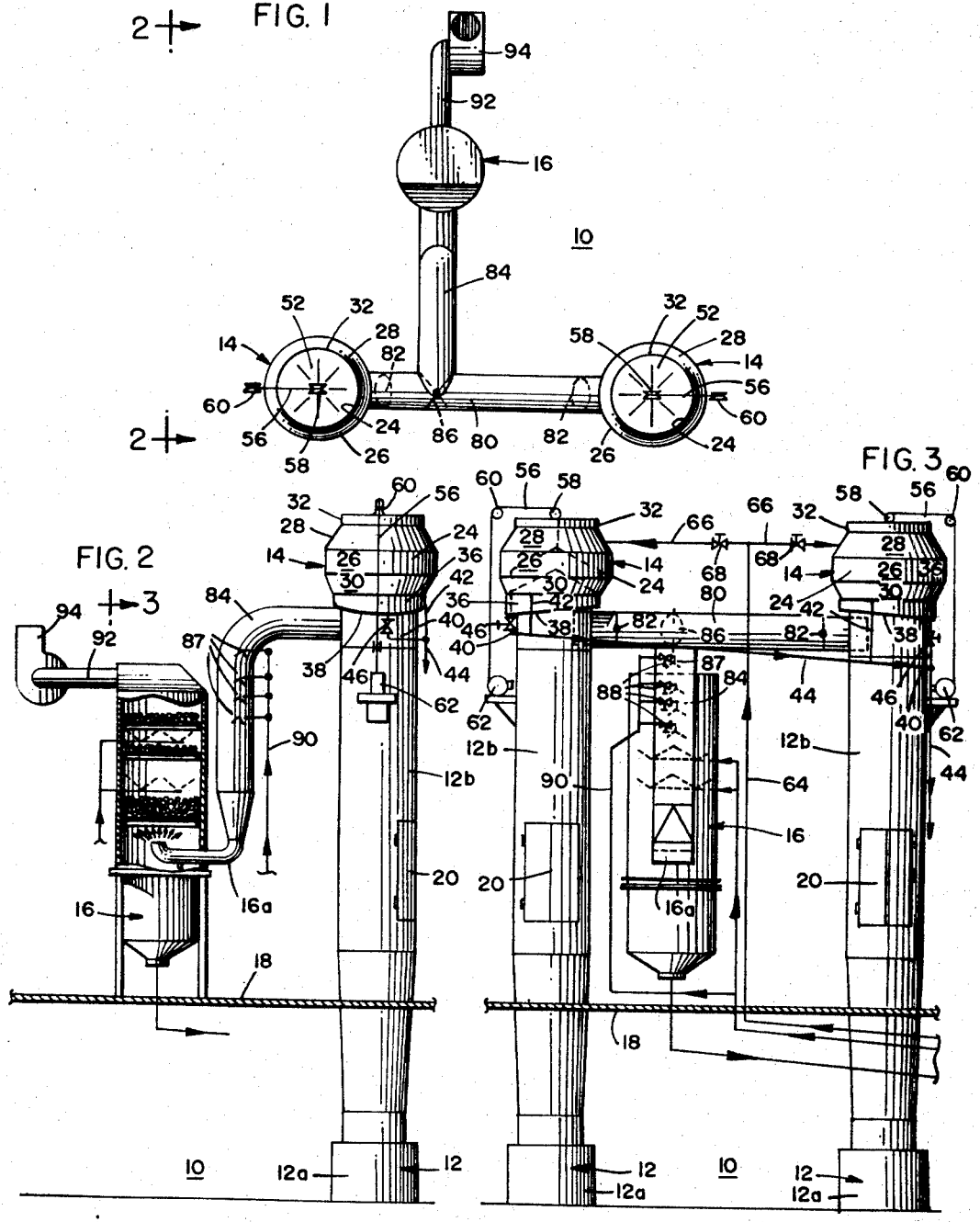
INVENTOR:
DANIEL D. DRUM

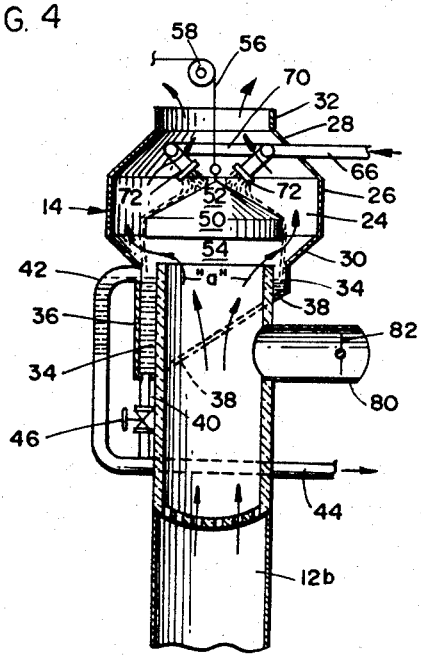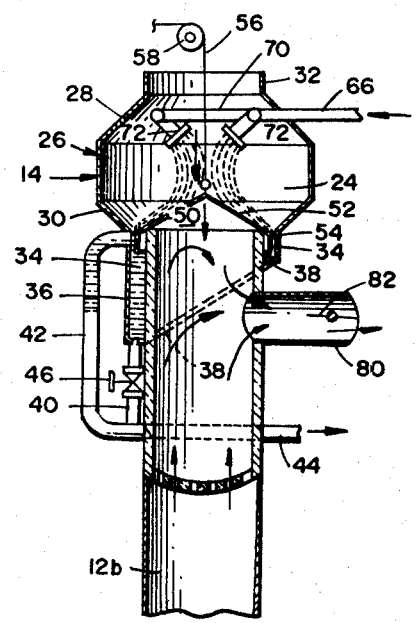

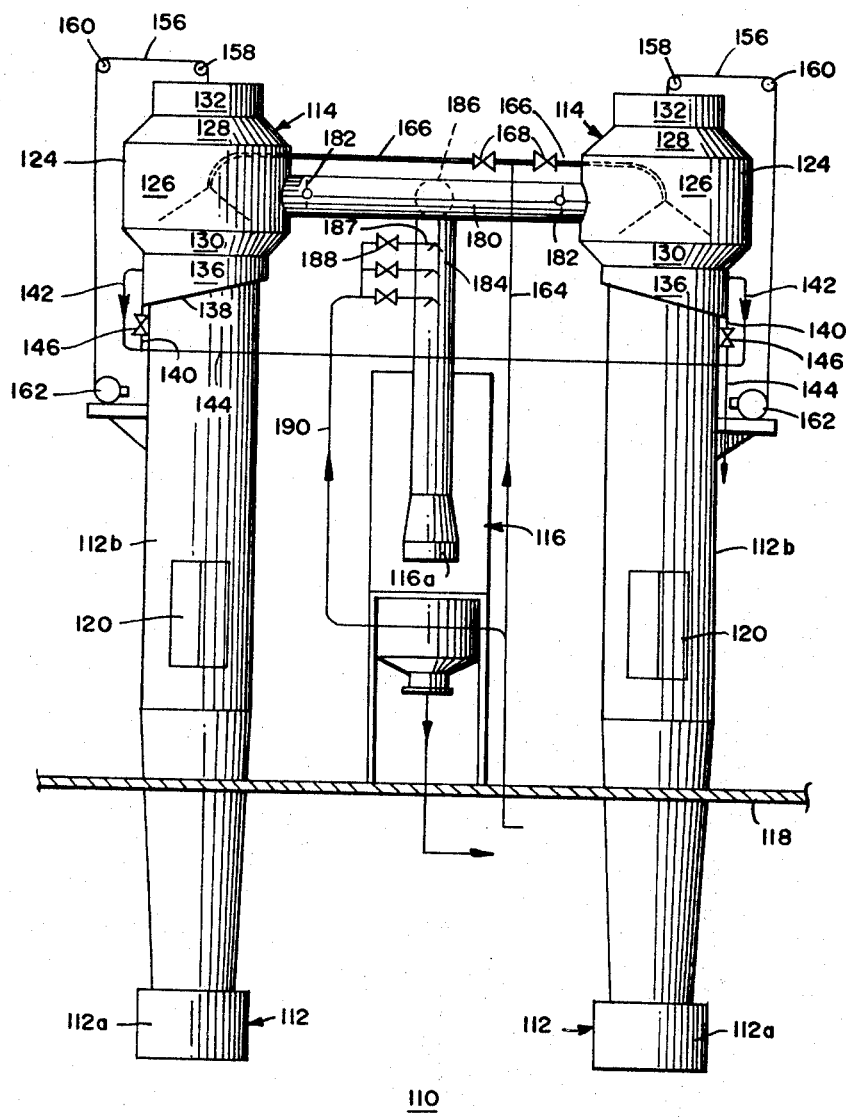

United States Patent Office 3,432,153
Patented Mar. 11, 1969

3,432,153
APPARATUS FOR COLLECTING CONTAMINANTS FROM GASES
Daniel D. Drum, Northbrook, Ill., assignor to National Dust Collector Corporation, Skokie, Ill., a corporation of Illinois
Filed Sept. 25, 1967, Ser. No. 670,033
U.S. Cl. 261—108
Int. Cl. B01d 47/06
10 Claims

ABSTRACT OF THE DISCLOSURE

Apparatus for collecting contaminants from gases comprising a quenching chamber having an inlet adapted for communication with the upper end of a gas stack and an outlet. The lower end of the chamber includes a liquid collecting trough around the stack below the upper end and a valve member including a depending skirt is mounted in the chamber for movement between an inlet closing position, wherein the lower end of the skirt extends into the liquid in the trough forming a gas-tight, liquid seal around the upper end of the stack and an open position wherein the skirt is above the liquid in the trough. When the valve member is open, liquid is directed onto the top of the valve member and flows downwardly around the skirt into the trough forming a continuous, flowing, liquid curtain for cooling and collecting the contaminants in the exhaust gases passing from the stack into the chamber.

---

The present invention relates to a new and improved apparatus for collecting contaminants from gases and is particularly useful for cooling and collecting the contaminants from high temperature gases before the gases are released into the atmosphere.

Because of increased attention to the problems of atmospheric pollution, it is desirable, and an object of the invention, to provide a new and improved apparatus for collecting the contaminants from gases before the gases are released into the atmosphere. More particularly, in industrial installations, wherein high temperature gases having contaminants therein are generated, it is desirable and an object of the invention to provide contaminant removal and purifying apparatus capable of withstanding the extremely high temperatures involved over long periods of usage without excessive deterioration. In many industrial installations, the gases generated contain acids and chemical compounds which attack and corrode steel and other materials that are commonly used in the fabrication of dust and air pollution control apparatus and, accordingly, it is desirable and an object of the invention to provide a contaminant collecting system for industrial gases which is better able to withstand corrosive attack without requiring the use of extremely expensive stainless steels and other costly acid and corrosion resistant materials.

Another object of the present invention is to provide a new and improved apparatus of the character described wherein the component parts, subject to direct contact with the high temperature gases, are continuously cooled so that oxidation and corrosion of these parts by the gases is reduced.

Yet another object of the present invention is to provide a new and improved apparatus of the character described which is useful as a primary gas purifying apparatus for cooling and removing contaminants in the gas before the gas is delivered to a secondary or final stage wherein separate dust collecting apparatus is employed to further purify the gas before it is released into the atmosphere.

Yet another object of the present invention is the provision of the new and improved apparatus of the character described employing a liquid quenching medium which serves a dual purpose in cooling the gas and the apparatus as well and, in addition, serves as a vehicle for collecting and carrying away contaminants.

Yet another object of the present invention is the provision of a new and improved apparatus of the character described for use in combination with a separate dust collector, wherein the contaminated gas, alternatively, may be treated in the apparatus and released directly to the atmosphere after such treatment or may bypass the apparatus altogether and flow directly into the separate dust collector for treatment before release to the atmosphere.

Yet another object of the present invention is to provide a new and improved apparatus of the character described in the preceding paragraph, wherein a gas-tight, liquid seal is provided around the inlet of the apparatus to effect the bypass to the separate dust collector.

For a better understanding of the present invention, reference should be had to the following detailed description and appended claims taken in conjunction with the drawings, in which:

FIG. 1 is a top plan view of a system for collecting contaminants from gas constructed in accordance with the present invention;

FIG. 2 is a side elevation of the system of FIG. 1 looking in the direction of the arrows 2—2 thereof;

FIG. 3 is a side elevation view of the system of FIG. 1 looking in the direction of the arrows 3—3 thereof;

FIG. 4 is an enlarged, side elevational view, with portions broken away and in section, illustrating one embodiment of a new and improved quenching chamber apparatus constructed in accordance with the present invention;

FIG. 5 is a side elevational view of the quenching chamber of FIG. 4 with the valve member therein in a different operative position;

FIG. 6 is a side elevational view similar to FIG. 3 but illustrating another embodiment of a system for collecting contaminants from gas constructed in accordance with the present invention;

FIG. 7 is an enlarged, side elevational view with portions broken away and in section of another embodiment of a new and improved quenching chamber constructed in accordance with the present invention; and FIG. 8 is a side elevational view of the quenching chamber of FIG. 6 with the valve member therein in a different operative position.

Briefly, the foregoing and other objects and advantages of the present invention are accomplished in one embodiment thereof by the provision of a new and improved apparatus for collecting contaminants from gases comprising a quenching chamber having an inlet adapted to communicate with a source of contaminated gas, such as the upper end of an exhaust stack. The chamber includes an upper outlet and a lower end portion around the inlet which defines a liquid collecting trough encircling the stack below the upper end thereof. A valve member including a depending skirt is movable in the chamber between a closed position wherein the skirt extends into the liquid present in the trough, thus forming a gas-tight, liquid seal between the stack and the chamber, and an open position where the skirt is spaced upwardly above the liquid in the trough, permitting the gases in the stack to flow into the chamber. Means are provided for directing a flow of liquid quenching medium, such as water, onto the upper surfaces of the valve member to flow downwardly around the skirt, forming a continuous, flowing, liquid curtain wall around the periphery of the skirt when the valve member is in the open position. The gases reaching the upper end of the stack flow radially outwardly through the liquid curtain wall into the chamber and, as they pass through the flowing liquid curtain wall, cooling and collection of contaminants in the gas is achieved. The liquid medium also serves to cool and wash the wall surfaces and components of the apparatus so that excessive deterioration, because of oxidation and corrosive acid and the like present in the gases, does not occur. In one arrangement, the gases passing into the chamber through the liquid curtain wall may then be directed to another, separate dust collector for a final scrubbing action before the cleansed gas is released to the atmosphere, or may be released to the atmosphere directly through the outlet of the chamber. Means are provided for removing the contaminant and sludge material collected in the quenching liquid which flows into the trough and, after removal of this material, the liquid medium is again recirculated through the system.

Referring now, more particularly, to the drawings and specifically to FIGS. 1, 2, and 3, therein is illustrated a system 10 for collecting contaminants from gases that are generated by a pair of cupola furnaces 12. The system 10 employs a pair of quenching chamber assemblies 14 constructed in accordance with the present invention in combination with a separate dust collector unit 16, preferably of the west scrubber type, such as that shown and described in United States Patent No. 2,691,423. While the invention is particularly well suited for treating contaminated gases generated by equipment such as the cupola furnaces 12, it is to be understood that the invention is useful in connection with the treatment of contaminated gases produced by a wide assortment of industrial processes and apparatus. It is also to be understood that dust collectors other than the wet scrubbing type may be utilized in the system of the present invention and that more than one dust collector could be used in combination with each quenching chamber unit 14, depending on their relative capacities and specific installation requirements.

Each cupola furnace 12 includes a base 12a and a stack 12b extending upwardly therefrom through an appropriate opening in an elevated furnace charging floor 18. The stacks 12b include large openings through which the ingredients for charging the furnaces are introduced, and the openings are provided with large charging doors 20 which are opened for charging and closed when the furnace is in operation. The stacks 12b contain the flow of hot gases generated by the process taking place in the cupola furnaces and these gases are produced at elevated temperatures (sometimes as high as 2,500° F.). Such gases generally contain relatively large quantities of objectionable particulate matter and fumes and, accordingly, the gases should not be directly released to the atmosphere if atmospheric pollution is to be minimized and reduced.

Each quenching chamber unit 14 is mounted on the upper end of a furnace stack 12b, as best shown in FIGS. 4 and 5, and is adapted to cool the gases and remove much of the objectionable contaminant materials contained therein before the gas is released into the atmosphere. For this purpose, each unit includes a relatively large housing or chamber 24, preferably fabricated of ordinary hot rolled steel. The chamber 24 comprises an enlarged diameter, cylindrical central or mid section 26 with an upper frustoconical section 28 and a lower frustoconical section 30 joined to the upper and lower ends thereof. The upper and smaller diameter end of the upper frustoconical section 28 is joined to a short, upstanding, cylindrical outlet duct 32 through which the gases are released to the atmosphere after treatment in the quenching chamber. The lower and smaller diameter end of the lower frustoconical section 30 serves as the inlet to the chamber 24 and is arranged in outward, concentric relation around the upper end of the cupola stack 12b.

Immediately below the upper end of the stack and around the exterior thereof is formed an annular, liquid collecting trough 34 having a cylindrical outer sidewall 36 spaced outwardly of and concentric with the stack and a vertically sloping, annular bottom wall 38 joined between the outer surface of the stack and the lower end of the sidewall. The upper end of the trough sidewall 36 is joined to the lower end of the lower frustoconical section 30 and supports the chamber or housing 24 in place on the upper end of the stack 12b.

Normally, the annular trough 34 is filled with liquid to an upper level slightly below the upper end of the stack 12b, as best shown in FIGS. 4 and 5, and because liquid is continuously supplied to the chamber during operation, one or more drain lines 40 are connected to the bottom wall 38 of the trough to drain off the liquid and collected contaminant material removed from the gases. In order to prevent the liquid in the trough 34 from overflowing into the upper end of the stack 12b, an overflow drain line 42 is connected to the outside wall 36 of the trough at the desired level, just below the upper end of the stack, and both the lines 40 and 42 are connected to a common drain line 44 running to a sediment treatment chamber (not shown), wherein the collected contaminants are removed from the liquid so that the liquid may be recirculated through the system. Each drain line 40 includes a flow regulator valve 46 for regulating the liquid drainage rate from the trough 34 to insure that the trough always contains the desired quantity of liquid during operation of the quenching chamber unit.

In accordance with the present invention, a large valve member 50 having an upwardly extending conical top wall 52, and an annular, cylindrical skirt 54 joined to the lower periphery thereof is mounted for vertical movement within the chamber 24. The valve member 50 is supported from the apex of its conical top wall 52 by a cable 56 extending vertically upward through the outlet stack 32. The cable 56 is trained over a pair of horizontally spaced pulleys 58 and 60 and passes downwardly, outwardly of the outer pulley 60 and is connected to an appropriate hoisting mechanism 62. The valve member 50 is movable vertically between an upper or open position (FIG. 4) wherein the lower edge of the skirt 54 is spaced above the upper end of the stack 12b and a lower or closed position (FIG. 5) wherein the lower end of the skirt extends downwardly into the liquid in the trough 34 forming a gastight, liquid seal around the upper end of the stack.

In order to supply quenching liquid, such as water, to the quenching chamber unit 14, a supply line 64 is provided which furnishes water under pressure to a pair of branch lines 66 running into the respective chamber, as best shown in FIG. 3. Each branch line 66 includes a flow control valve 68 for regulating the amount of liquid supplied. Within each chamber 24 is mounted a manifold 70 having one or more spray nozzles 72 connected thereto and positioned to direct a spray of liquid onto the upper surface of the conical top wall 52 of the movable valve member. Each manifold 70 is connected to a branch line 66 for a supply of quenching liquid, and the liquid is distributed over the top of the valve member 50 by the nozzles 72 so that an annular, flowing, liquid curtain wall is formed around the skirt 54, as shown in FIG. 4.

When the valve 50 is in the open position of FIG. 4, the annular liquid curtain wall flows from around the lower edge of the skirt 54 into the annular collecting trough 34 around the upper end of the stack 12b. The hot gases generated by the cupola furnaces 12 and flowing upwardly, in the stacks 12b reach the upper end of the stacks and flow outwardly through the liquid curtain walls in a generally radial direction, as indicated by the arrows a (FIG. 4). As these hot gases pass outwardly through the flowing liquid curtain wall, the gas temperature is lowered considerably and many of the contaminant particles and objectionable fumes are absorbed and collected by the liquid as it flows downwardly into the trough 34. The cleansed gas outwardly of the liquid curtain wall then flows upwardly around the outside of the valve member 50 and out the top of the chamber through the outlet duct 32.

The liquid quenching medium delivered by the spray nozzles 72 not only cools the gases and collects contaminant particles and fumes therefrom, but, additionally, cools the interior surfaces of the housing 24 and the valve member 50. Moreover, the continuous flow of water and spray or droplets generated by the nozzles and surfaces of the chamber causes most of the corrosive materials and acids to be washed out into the trough 34 where they are carried out via the drain line 44 along with other contaminant material. Accordingly, the apparatus 14 can be constructed of mild steel or other conventional material, rather than expensive corrosion and heat resistant materials, such as stainless steels and the like.

Because the gases treated by the apparatus 14 pass through a flowing, liquid curtain wall most of the objectionable contaminants and fumes are removed and the gases are well cleansed before release to the atmosphere. The flow rate of liquid flowing in the liquid curtain wall is controlled by the valves 68, and when the flow rate is increased, better cleansing of the gases is achieved because the effective thickness of the water wall curtain is increased. Once the proper liquid flow rate has been established, the drain valves 46 are adjusted to maintain a desired liquid level in the collecting trough 34 and the sloping bottom wall 38 of the collecting trough 34 accelerates the settling out of the contaminant material collected and facilitates its removal through the drain lines 40 and 44.

The quenching chamber assemblies 14 of the present invention are extremely useful in removing a major portion of the contaminants and fumes from the stack gases produced by the cupola furnaces 12; however, during some portions of the process cycle in the furnaces it is desirable that the gases produced be subjected to more thorough scrubbing action in order to remove particles in the smaller size category (i.e., 1 to 2 microns), and to this end the dust collector unit 16 is utilized in the system. In accordance with the present invention, the two cupola stacks 12b are interconnected to one another by a transverse stack connector duct 80. Opposite ends of the duct 80 are joined with the respective stacks 12b through openings spaced below the upper ends of the stacks, and damper assemblies 82 are provided to control the flow from the respective stacks into the duct. The connector duct 80 is in communication with an inlet duct 16a on the dust collector 16 by means of a downcomer pipe 84 which is connected to the transverse duct 80 intermediate its opposite ends. At the junction of the upper end of the downcomer pipe 84 and the duct 80, there is provided a two-way damper 86 which will direct the gases from one cupola stack 12b into the downcomer pipe 84 and shut off the gases from the opposite cupola stack 12b.

In the system 10 as illustrated, one of the quenching chamber units 14 can be in operation for the gases of one cupola furnace while the gas generated by the second cupola furnace is directed via the duct 80 and downcomer pipe 84 for treatment by the dust collector unit 16. In this type of operation, the valve member 50 in the operative quenching chamber 14 is in an open position, as shown in FIG. 4, and the damper 82 in the duct 80 is closed, as shown. The valve member 50 in the quenching chamber of the second cupola furnace is in a closed position, as shown in FIG. 5, and the damper 82 is open, permitting the gases to flow through the duct 80 and into the dust collector unit 16 and through the downcomer pipe 84. Referring specifically to FIG. 5, when the valve member 50 is in a closed position, the skirt 54 extends downwardly into the liquid in the collecting trough 34 positively sealing the upper end of the stack 12b with a gas-tight liquid seal. A small amount of liquid is directed onto the upper surface 52 of the valve member for cooling, because of the high temperatures of the gases touching the undersurface thereof.

Before the hot gases from the closed off stack reach the dust collector 16, it is desirable to cool them somewhat, and this is done in the downcomer pipe 84 by a plurality of spray nozzles 87, each individually controlled with a valve 88 and supplied from a common supply line 90. The gas flowing through the downcomer pipe 84 is cooled before entering the dust collector 16, and the liquid introduced by the spray nozzles 87 collects some of the contaminants from the gas, reducing the load on the dust collector 16. The operation of the dust collector 16 is described fully in the above mentioned United States patent and will not be described herein. The cleansed gases reaching the upper end of the housing of the dust collector 16 are then exhausted to the atmosphere by means of an exhaust duct 92 and fan 94.

From the foregoing it can be seen that two cupola furnaces 12 can be operated simultaneously with the stack gases from one of the furnaces being cleansed by a quenching chamber assembly 14 while the stack gases from the other furnace are being cleansed by the separate dust collector 16. By manipulating the control valves 50 within the respective quenching chamber assemblies 14 and the dampers 82 and 86, the gas flow can be reversed whereby the gas of the second cupola furnace is cleansed by the other quenching chamber 14, and the stack gases of the first mentioned cupola furnace are delivered to the dust collector 16 for cleansing.

Referring now to FIGS. 6, 7, and 8, therein is illustrated another embodiment of a system for collecting contaminants in accordance with the present invention, and referred to generally by the reference numeral 110. It should be noted that reference numerals bearing the prefix 1 are used for identifying components and parts in the second embodiment which are identical or similar to those in the first embodiment and, accordingly, the description will be limited to significant differences in the two embodiments. The system 110 includes a pair of quenching chamber units 114 similar to the units 14 but somewhat larger in vertical dimension so that the cylindrical midsections 126 may be connected to the opposite ends of the transverse connecting duct 180. The duct 180 extends between the quenching chamber units 114 rather than between the cupola furnace stacks 112b and, accordingly, the gases generated in one cupola furnace 112 may be first treated by a quenching chamber unit 114 mounted on the stack 112b thereof in a primary cleaning stage and then directed to a separate dust collector 116 for a final stage of treatment via the duct 180 and downcomer pipe 184. In other words, the gas generated in one cupola furnace 112 may be subjected to a single stage of treatment in a quenching chamber 114 before release to the atmosphere or can be subjected to a two-stage cleaning process; the first stage being in the quenching chamber unit 114 and the second or final stage being carried out in the dust collector 116 before the gas is finally released into the atmosphere.

Each quenching chamber unit 114 includes a valve member 150 similar in construction to the valve member 50 of the previous embodiment. The valve members 150 are adapted to open and close the upper outlet ducts 132 of the chamber 124 and do not act to open and close the upper ends of the cupola stacks as do the valve members 50 of the previous embodiment. When the valve member 150 is lowered to the open position (FIG. 7), the gas flowing into the chamber 124 can pass freely into the atmosphere through the outlet duct 132, and when the valve member is then raised to the closed position (FIG. 8) the gas flows into the duct 180 and downcomer pipe 184 to the separate dust collector unit 116. In the latter instance, the damper 182 is opened as shown, and the damper 186 is set to prevent the gas from flowing directly through the duct 180 into the other quenching chamber.

The quenching chamber units 114, unlike the chambers of the previous embodiment, includes a stationary baffle member 250 having a conical top wall 252 and annular, cylindrical skirt 254. The baffle member is positioned above the upper end of the stack 112b and a flow of liquid is directed onto the upper surface of the conical top member 252 to flow downwardly around the skirt 254 into the collecting trough 134. An annular curtain wall of flowing liquid is formed between the lower edge of the skirt 254 and the liquid in the trough 134 and the gas must pass through this flowing liquid curtain wall before it is released to the atmosphere through the outlet duct 132 or is directed to the dust collector 116 for further wet scrubbing action.

It can be seen from the foregoing discussion, that the system 110 and quenching chamber units 114 offer the alternatives of single or double stage cleaning action on the gas and, accordingly, a flexibility of operation that is extremely useful in connection with cupola furnaces, because the gas generated during a cycle changes considerably and during some periods only a single stage of contaminant collection is required, while during other periods a double stage of purification is desirable because of the large amounts of contaminants and objectionable fumes present in the gases. The liquid medium flowing over the baffle member 250 performs a double function of cooling the gas and the apparatus as well as collecting contaminants from the gas and, if required, the dust collector 116 can be brought into the system to further cool and clean the gases before discharge to the atmosphere.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for collecting contaminants from gases comprising a quenching chamber having an inlet adapted to be in communication with the upper end of a stack and an outlet, said chamber including a lower end portion defining a liquid collecting trough around said stack below said upper end thereof, a valve member in said chamber including a depending skirt and movable between a stack closing position wherein said skirt extends into the liquid in said collecting trough forming a gas-tight, liquid seal around said stack and an open position wherein said skirt is above the liquid in said trough permitting said gases to flow from said stack into said chamber.

2. The apparatus of claim 1 wherein said valve member includes an upwardly convex top wall joined around its periphery with said skirt, and means for directing a flow of liquid-quenching medium onto the upper surface of said top wall to flow downwardly and around said skirt toward said collecting trough, said top wall and said last mentioned means positioned relative to one another whereby said liquid-quenching medium forms a continuous, flowing, liquid curtain around the periphery of said skirt between said skirt and said collecting trough for cooling said exhaust gases and collecting contaminants contained therein as said gas flows out of said stack into said chamber.

3. The apparatus of claim 1 in combination with a separate dust collector for removing contaminants from said exhaust gases, duct means connected between said exhaust stack and said dust collector for directing said exhaust gases from the former to the latter when said valve member is in said open position and valve means in said duct means for controlling the flow of said exhaust gases through said duct means.

4. The apparatus of claim 1 including drain means for removing liquid collected in said collecting trough at a selectively adjustable rate for maintaining a selected level of liquid in said trough in order to effect said seal when said valve member is closed.

5. The apparatus of claim 4 including overflow drain means for limiting the upper level of liquid collected in said collecting trough to prevent said liquid from flowing into said stack.

6. The apparatus of claim 2 wherein said top wall of said valve member is conically shaped and is supported at its upper apex for movement between said open and closed position.

7. Apparatus for collecting contaminants from gases comprising a quenching chamber having an inlet adapted for communication with the upper end of said stack and an outlet, said chamber including a lower end portion defining a liquid collecting trough around said stack below said upper end thereof, an upwardly convex baffle means in said chamber spaced above said stack and including a peripheral edge spaced above said collecting trough, means for directing a flow of liquid quenching medium onto the upper surface of said convex baffle means to flow downwardly thereon around the peripheral edge thereof into said trough forming a continuous, flowing liquid curtain across the path of exhaust gases flowing from said stack into said chamber, and outlet valve means in said chamber movable between an open position and a closed position blocking said outlet.

8. The apparatus defined in claim 7 in combination with a dust collector for removing contaminants from said gases, duct means connected between said chamber and said dust collector for directing said gases from the former to the latter when said outlet valve means is in a closed position, and valve means in said duct means for controlling the flow of gases therethrough.

9. The apparatus of claim 8 wherein said baffle means and said outlet valve means both include upwardly extending, conically shaped top portions with the apexes thereof in coaxial alignment.

10. The apparatus of claim 8 wherein said liquid curtain is annular and is spaced radially outwardly around the upper end of the exhaust stack, said duct means being connected to said chamber at a point exteriorly and above said curtain.

References Cited
UNITED STATES PATENTS

| | | |
|---|---|---|
| 292,760 | 1/1884 | Murray. |
| 1,126,692 | 2/1915 | Blanchette. |

HARRY B. THORNTON, *Primary Examiner.*

U.S. Cl. X.R.

55—241, 257, 417